SPEECH IMMUNITY VOICE FREQUENCY SIGNALLING SYSTEM

Filed May 29, 1962 2 Sheets-Sheet 1

INVENTOR

E HERTER

BY Paul Hemminger

ATTORNEY

INVENTOR

E. HERTER

BY Paul Henninger

ATTORNEY 3,200,205
Patented Aug. 10, 1965

3,200,205

SPEECH IMMUNITY VOICE FREQUENCY SIGNALLING SYSTEM

Eberhard Herter, Stuttgart, Germany, assignor to International Standard Electric Corporation, New York, N.Y., a corporation of Delaware Filed May 29, 1962, Ser. No. 198,562
Claims priority, application Germany, June 19, 1961, St 17,969
4 Claims. (Cl. 179—84)

Figure 1:
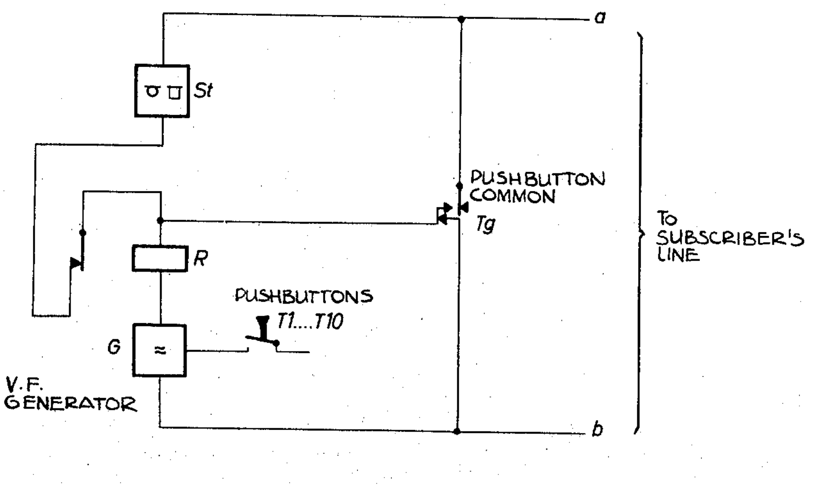

The present invention relates in general to voice frequency signalling systems and in particular to speech immunity voice frequency signalling systems. In such systems voice frequencies are transmitted either individually or in combination to the exchange upon operation of push-button keys to indicate a switching instruction. To condition the receiving equipment to respond to these frequencies, the subscriber's loop is interrupted independently of the switching manipulation performed by the subscriber.

In telephone systems employing voice-frequency push-button arrangements, it is necessary that the signal transmission be reliable so that the voice-frequency voltages which are produced during the selecting process by the microphone of the substation set, will not interfere with the transmission of the switching instructions.

In known types of push-button-selecting systems, speech immunity is achieved by simultaneously transmitting an additional signal lying outside the speech band with each voice frequency signal. At the exchange, the normally disconnected signal receivers are connected only after an evaluation of this additional signal is effected. Systems using these additional voice frequency signals are generally costly and unacceptable since at least two frequencies must be produced simultaneously by the substation set.

To overcome this costly arrangement, the direct current of the loop circuit is used in many cases as the noted additional signal. One such alternative arrangement proposes to reduce the loop current during the transmission of the switching instruction frequencies, which arrangement requires a direct-current evaluator at the exchange which is capable of distinguishing between the leakage current of the line, the signal current, and the loop current. As a result of varying line conditions, this discrimination is not easily determined in an unambiguous way, because the noted currents partly overlap each other. To prevent the ambiguous discrimination, special stabilizing arrangements become necessary which represent an increased expenditure.

Another known method proposes the use of different current directions during the selecting process. This method, however, can only be advantageously employed with register systems employing equally long subscriber's call numbers. In cases where these conditions do not exist, special equipment is needed to indicate to the exchange the end of the selecting process.

In still other known methods, speech immunity is obtained by transmitting a short loop interruption before transmitting the switching instruction. A control device at the exchange connects the voice-frequency receivers and maintains them connected for the purpose of supervising the end of the switching instruction. The receivers are released after the completion of the proper number of digits. This method offers the advantages that speech immunity can be achieved quite simply. However, this method has the disadvantage that the signalling speed is substantially reduced by the noted momentary loop interruptions. Since the switching instruction has a duration at least equal to the period of time which corresponds to the period of the loop interruption plus the maximum time required by the receiving equipments for performing the evaluation.

It is one object of the present invention to provide a signalling method by which speech immunity is obtained without reducing the signalling speed. This is accomplished by maintaining the voice-frequency signal receivers connected to the subscriber's line in the ready-to-receive state, in disabling the speaking circuit of the subscriber's station during switching instruction transmission and in maintaining the voice-frequency receivers operated for a certain time after the transmission of switching instructions. During this certain time interval, the evaluation of the switching instruction is performed if the subsequent loop interruption is registered. In this way the evaluation of the signal is only performed during the signal interval. Accordingly, the time duration of the switching instruction depends only on the operating time of the receivers. The time duration of the interruption as well as the evaluating time fall within the pulse interval which, in conventional types of push-button-selecting methods, is usually longer than the duration of the switching instruction, so that the speech-immunity criterion will not cause a reduction of the signalling speed.

The circuit arrangement for carrying out the inventive type of signalling method is characterized by the fact that the subscriber's station includes switching means which, during the signal intervals, is rendered ineffective by a common selecting push-button contact, and upon the operation of a random selecting push-button, the switching means is rendered effective. After the selecting push-button is returned to normal, the loop circuit is interrupted for the time of release of the switching means. In another embodiment of the invention, after any random selecting pushbutton is released, a switching device reverses the current direction of the line loop. In such embodiment, the current direction is changed at the receiving station after each evaluation of a switching instruction. In order to insure that responsive to the connection of the register the correct current direction is immediately chosen, the switching device is set to a certain position and, consequently, the station is set to a certain current direction upon replacement of the handset. In the case of call numbers of varying numbers of digits, the current direction of the subscriber's station may be of the wrong polarity. To preclude this, a further embodiment discloses a circuit arrangement which returns the current direction, upon disconnection of the register, by a connecting link, to direction having been the last one rendered effective by the register. In this way no switching means need be supplied in the signal circuit, since an interruption of the loop will always appear after each switching instruction, and the correct current direction is applied via the register.

Figure 2:
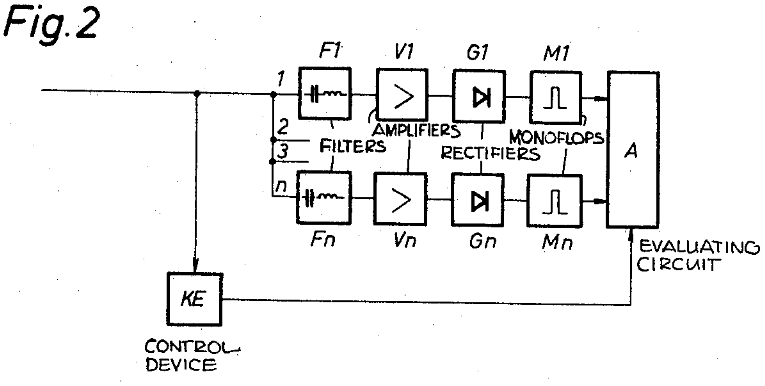
Figure 3:
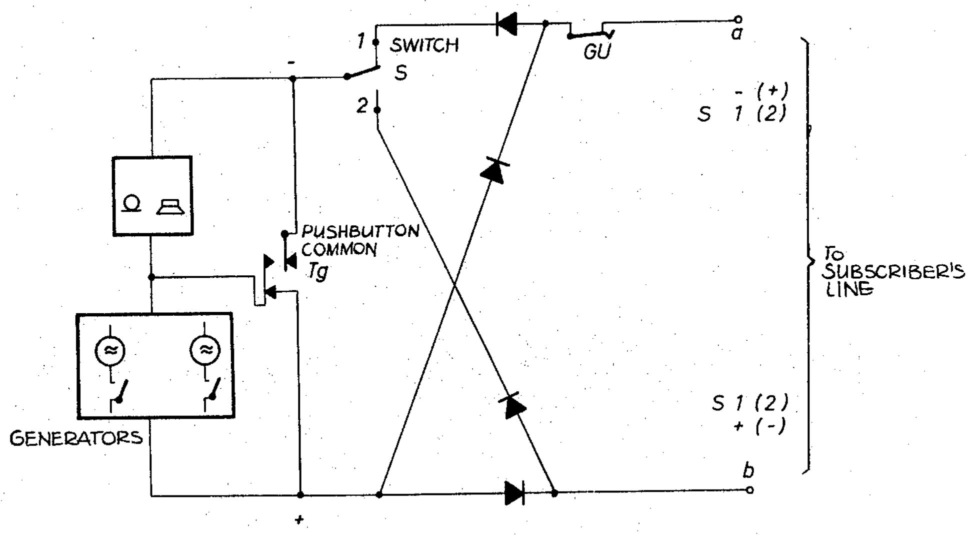

In the following, the invention will now be explained in detail with reference to some basic circuit diagrams:

FIG. 1 shows the circuit arrangement of the subscriber's station in schematic form, FIG. 2 shows the receiving arrangements in schematic form, and FIG. 3 shows another type of arrangement of the subscriber's station for use in the signalling method according to the invention.

FIG. 1 shows the circuit arrangement of the sub-station set in the signal resting condition. All of the pushbutton contacts $T_1 \ldots T_{10}$ and $T_g$ are at normal. The normal station circuit $S_t$ is connected via the back contact *c* pushbutton contact $T_g$ to the subscriber's line *a*, *b*. In order to transmit a switching instruction one of the pushbutton contacts $T_1 \ldots T_{10}$ is actuated, which results in the operation of the common pushbutton contact $T_g$ as well. The contacts $T_1 \ldots T_{10}$ control the generator circuit and vary the frequency of the generator voltage or the combination of the generator voltages. The common pushbutton contact $T_g$ controls the disconnection of the station circuit and the energizing of the generator circuit. It should be noted that the contact $T_g$ is preferably designed as a make-before-break contact, so that no loop interruption will appear at the beginning of the signal. As a result of the operation of one of the pushbuttons, the switching means R is energized in the signal circuit. After the operated signal pushbutton is released, the generator circuit is de-energized by the common pushbutton contact $T_g$. Since the switching means R, during its releasing time, still holds its contact *c* in the operated condition, an interruption of the loop is caused subsequently to the transmission of each switching instruction. The time duration of the loop interruption is determined by the release time of the switching means R.

It will now be explained, in conjunction with FIG 2, how speech immunity is obtained using this circuit arrangement.

Responsive to the closure of the line loop, a receiving equipment has been connected to the subscriber's line. This receiving arrangement comprises *n* voice-frequency receivers each comprising equipment such as filters F1, amplifiers V1, rectifier stages G1, and monostable flip flop circuit VM1. All of the voice-frequency receiver outputs $M1 \ldots M_n$ are connected to the evaluating circuit A for identifying the coded signals received from the transmitting station. A control device KE is connected to the line for blocking the evaluating device A as long as a current is passing through the loop. In the no signal condition, the incoming voice-frequency voltages operate the respective voice-frequency channels 1 to *n* but since the control device KE does not register a loop interruption, the evaluating circuit A remains blocked. Upon transmission of a switching instruction when the corresponding voice-frequency signal is transmitted over the line, the associated voice-frequency channels respond by switching the output monostable flip flop circuits M1. These monostable flip flop circuits act as memories or stores since they remain in their position for a certain period of time after the disconnection of the switching instruction. During this time the loop interruption, as produced by the subscriber's station, is detected by the control device KE. The evaluating circuit A is thereafter unblocked, and the transmitted switching instruction is received. At this time, the speaking circuit is disabled. Care has to be taken that the signal-delay time which is produced by the monostable flip flops, will not interfere with the loop interruption. After the evaluation of the transmitted switching instructions, the evaluating circuit is blocked by the control device KE if the loop is still interrupted. In this way it is possible to effect a simple separation between speech and signal voltages, without requiring a long signal duration for the switching instructions.

The basic ideas of the inventive type of signalling method have been explained in detail with reference to the foregoing example. This, however, does not mean to imply that the interruption of the loop has to be produced in this particular way, or that receivers of this particular type have to be used. By employing the basic idea, namely, that of evaluating the signal during the signal interval by utilizing a loop interruption for serving as the signal criterion, it is possible to provide various switching variations.

FIG. 3 shows another type of circuit arrangement of the subscriber's station. The noted switching means in the signal circuit of the other embodiments can be omitted. Prior to the transmission of the first switching instruction the subscriber's station is in position 1. When the register is connected the current supply is connected in a way that the *a*-wire is more negative than the *b*-wire. As before, operation of a selecting pushbutton results in the operation of the common contact $T_g$, the speaking circuit is short-circuited, and the signal circuit is energized.

In the register, the voice-frequency receivers which are tuned to the frequencies of the transmitted signals respond to the transmitted signals but evaluation thereof is delayed. When the selecting pushbutton is released, switching device S is brought into its position 2. With respect to the supply-current direction there will now appear an interruption, because the subscriber's station has thereby been switched-over to the other current direction. This interruption indicates to the receiving station that the evaluation may be started. Since the current direction in the register is reversed only after the evaluation of the switching instruction, the speaking circuit is still ineffective. After the current direction in the register has been reversed, a new switching instruction can be transmitted by the transmitting station. The speaking and signalling circuit will receive a operating voltage by the associated rectifiers if the switching device S has assumed a predetermined switching position, and if the current passes through the line in a certain predetermined direction.

After the end of the next switching instruction, the switching device S is returned to its position 1, and causes the generation of a new loop interruption, which interruption is terminated after the register has been switched back to the normal current direction after the evaluation of the switching instruction. This process is repeated during the transmission of each switching instruction. The switching device S will either assume its position 1 or 2 during the speaking condition depending on the number of transmitted switching instructions. In order to provide the speaking circuit with current after the disconnection of the register, the connecting link controls the current supply in the direction which characterizes or identifies the last reversal effected in the register. Thus each new selection is started with a certain current direction. For this reason, upon replacing the handset, the switching device S is always brought back into its position 1. This is accomplished by providing a corresponding mechanical coupling between the hook-switch contact $G_u$ and the selecting pushbuttons.

While the principles of the invention have been described above in connection with specific apparatus and applications, it is to be understood that this description is made only by way of example and not as a limitation on the scope of the invention.

What is claimed is:

1. In a voice frequency signalling system for selectively transmitting voice frequency signals from a remote station to central equipment over an interconnecting signalling line, means in the said station responsive to the initiation of a call for establishing a direct current path over said line and for transmitting voice frequency signals indicative of any digit of a telephone number over said line, means in the central equipment for storing said signals, means in the said station responsive to ending each said transmission of signals for temporarily interrupting said direct current path, signal evaluating means in said central equipment, and means in said central equipment responsive to said interruption for operating said evaluating means.

2. A voice frequency signalling system as set forth in claim 1 wherein means is provided in the central equipment for normally maintaining the said storage means connected to said line and in a ready-to-receive condition and for normally maintaining the said evaluating equipment in an unoperated condition.

3. A voice frequency signalling system as set forth in claim 1 wherein means is provided for reversing the direction of current flow over said line to generate the said temporary interruption.

4. A voice frequency signalling system as set forth in claim 3 wherein the said reversing means reverses the direction of current flow after each said transmission of digit signals and wherein means is provided for insuring current flow in a predetermined direction after completion of each call.

References Cited by the Examiner

UNITED STATES PATENTS

| | | | |
|---|---|---|---|
| 2,276,037 | 3/42 | Hecht et al. | 179—16 |
| 2,406,001 | 8/46 | Deakin | 179—16 |
| 2,438,496 | 3/48 | Deakin | 179—90 |
| 2,927,971 | 3/60 | Busala et al. | 179—90 |
| 3,008,009 | 11/61 | Van Lottum et al. | 179—90 |
| 3,065,305 | 11/62 | Nilsson et al. | 179—90 |

ROBERT H. ROSE, *Primary Examiner.*

WALTER L. LYNDE, *Examiner.*